United States Patent [19]

Yano et al.

[11] 4,380,733
[45] Apr. 19, 1983

[54] FREQUENCY AND SPEED DISPLAY DEVICE

[75] Inventors: Hiroshi Yano, Higashiyamato; Teruo Kawasaki, Yokohama; Hiroyuki Nomura, Fujisawa; Mikio Takeuchi, Yokohama, all of Japan

[73] Assignee: Nissan Motor Company, Limited, Kanagawa, Japan

[21] Appl. No.: 180,956

[22] Filed: Aug. 25, 1980

[30] Foreign Application Priority Data

Aug. 24, 1979 [JP] Japan .............................. 54-107181

[51] Int. Cl.³ ........................ G01P 3/48; G01P 3/54
[52] U.S. Cl. ................................. 324/166; 340/670; 364/565

[58] Field of Search .................. 324/166, 162, 161; 340/670, 669; 364/565, 566

[56] References Cited

U.S. PATENT DOCUMENTS 3,885,873 5/1975 Andermo ..................... 324/161 X
4,125,295 11/1978 Ruhnau et al. .................. 364/565 X Primary Examiner—Stanley T. Krawczewicz
Attorney, Agent, or Firm—Lowe, King, Price & Becker

[57] ABSTRACT

A device senses changes in a frequency or speed to be displayed. A display control circuit controls the time interval for updating the display, according to the magnitude of a sensed change in the frequency or speed, thereby avoiding flickering of the display, as well as improving the accuracy and up-to-dateness of the frequency or speed displayed.

11 Claims, 4 Drawing Figures

4,380,733

FREQUENCY AND SPEED DISPLAY DEVICE

BACKGROUND OF THE INVENTION

1. Field of the Invention

The present invention relates to a frequency or speed display device, and more particularly to a digital frequency meter, speedometer or tachometer wherein the display is updated according to the magnitude of a sensed frequency or speed change.

2. Detailed Description of the Prior Art

Recently, a digital display has come to be used as a speedometer or tachometer in automotive vehicles instead of a conventional analog pointer type meter. In a digital display type meter, a binary coded decimal (BCD) signal representing the vehicle or engine speed is latched for each of the pulse durations of a clock signal and sent through a decoder for conversion to a seven segment signal. This signal is then sent to a digital display such as a fluorescent display tube using seven segment digit displays, thereby indicating the vehicle or engine speed.

If the latch pulse duration is too short, the display tends to flicker because of slight speed fluctuations and power supply voltage changes even while the vehicle is running at substantially constant speed. In order to avoid this problem, prior art devices have adopted a relatively long pulse duration, for example of about two seconds, for updating the speed display, by using a clock signal of relatively low frequency.

However, with such a display method, the display of the vehicle speed is updated relatively infrequently even when the vehicle or engine speed changes rapidly, as during acceleration or braking. Therefore, a lag occurs between the actual vehicle speed and the displayed speed so that the driver does not get accurate and up to date information.

SUMMARY OF THE INVENTION

In order to overcome the problems as described above, in a speed display device according to the present invention, changes in the vehicle or engine speed are monitored, and the frequency of updating the displayed information is varied accordingly to provide a desirable up to date and yet stable display. This is done by holding the instantaneous speed value for a predetermined time, and then producing a difference signal representing the difference between the current speed and the previously stored speed value.

Means is provided for latching an instantaneous value of the speed. Another means is provided to control the time interval for updating the speed display, according to the magnitude of the sensed change of speed. The controlling means includes a first comparator which compares the output of the sensing means with a first predetermined reference value, and a second comparator which compares the output of the sensing means with a second predetermined reference value higher than the first predetermined reference value. The controlling means further includes means for generating three clock signals with different frequencies, and means for selecting one of the three clock signals according to the outputs of the first and second comparator to supply the selected clock signal to the latching means to control the latching time duration by pulses of the selected clock signal.

Other objects, features and advantages of the present invention will be more clear from the following description of a preferred embodiment thereof, taken in conjunction with the accompanying drawings.

DETAILED DESCRIPTION OF THE PREFERRED EMBODIMENT

In order to facilitate understanding of the present invention, a prior art speedometer will be briefly described.

Figure 1:
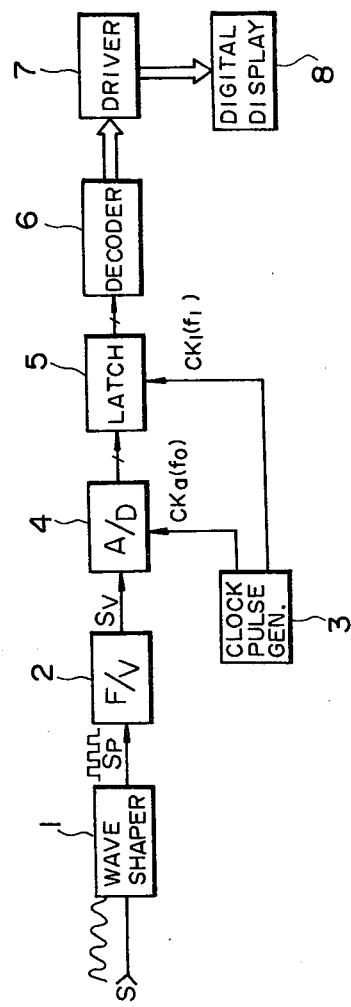
FIG. 1 is a block diagram of a prior art speed display device for use with an automotive vehicle.

Referring to FIG. 1, there is shown a prior art digital speed display device for use in an automotive vehicle. An output pulse signal from a speed sensor, not shown, and having a frequency proportional to the vehicle speed is shaped by a wave shaper 1 to a square pulse signal $S_p$ which is transformed by a frequency/voltage converter 2 including an integrating circuit to a voltage signal $S_v$. This signal $S_v$ is converted to a binary coded decimal signal by an A/D converter 4 by a sampling technique, using pulses of a clock signal $CK_0$ having a frequency of $f_0$, as derived from a clock pulse generator 3 as a timing signal. The resulting BCD signal from converter 4 is latched by a latch circuit 5 in synchronism with the timing of a latch signal $CK_1$ derived from generator 3; signal $CK_1$ has a frequency $f_1 < < f_0$ so during each pulse duration of the signal $CK_1$ there are several pulses from generator 3. This latched BCD signal is decoded by a decoder 6 to a seven segment signal which is sent through a driver 7 to digital display 8 using a seven-segment fluorescent display tube, for example.

Figure 2:
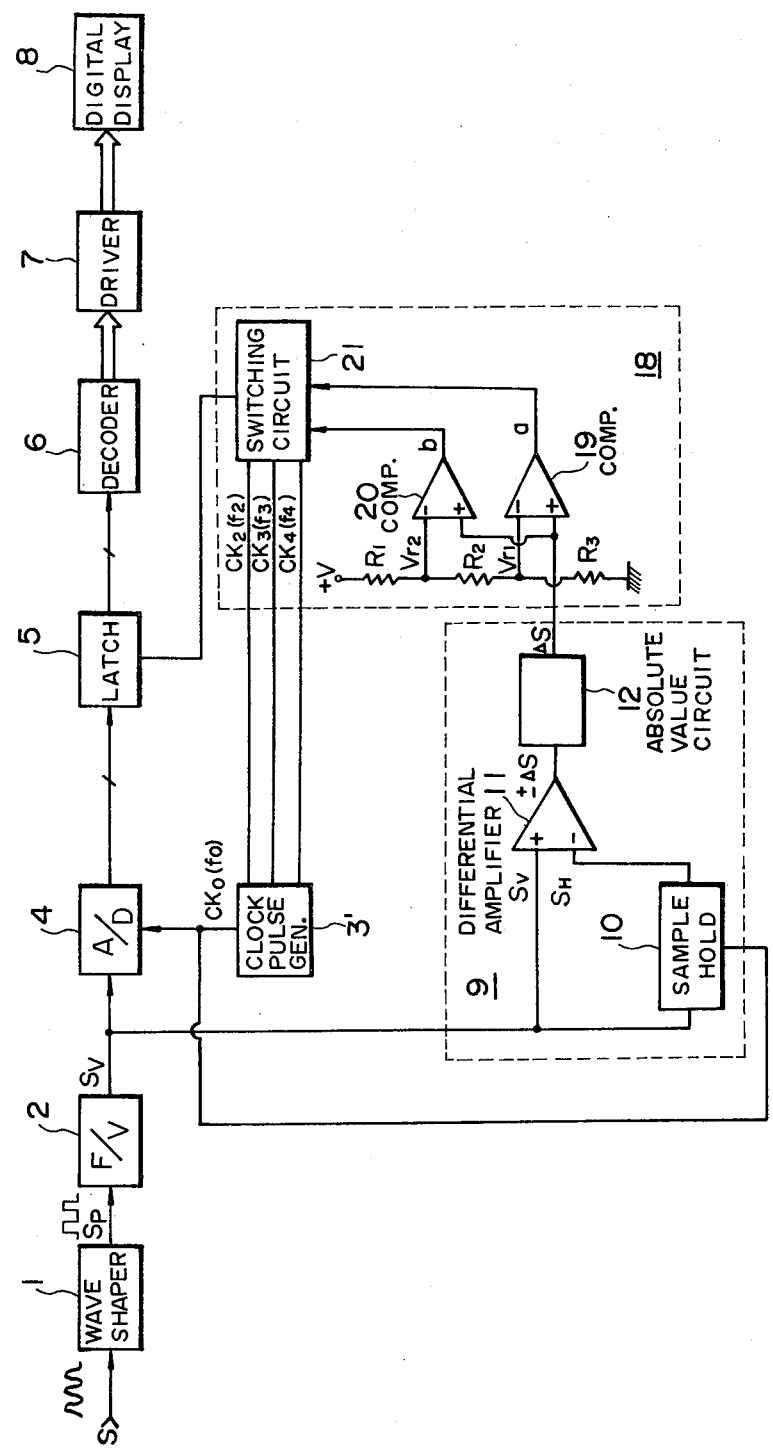
FIG. 2 is a block diagram of a preferred embodiment of a speed display device according to the present invention.

In a preferred embodiment of the speed display device according to the present invention, as illustrated in FIG. 2, a wave shaper 1 converts a pulse output signal S from a speedsensor, not shown, into a square pulse signal $S_p$; signal S has a frequency proportional to the vehicle speed. This signal $S_p$ is supplied to a frequency to voltage (F/V) converter 2, which may be an integrator, and which converts the signal $S_p$ to a signal voltage $S_v$. The device further includes an analog to digital converter 4 which converts the signal $S_v$ to a binary coded decimal (BCD) signal using as timing pulses a clock signal $CK_0$ with a frequency $f_0$ as derived from a clock pulse generator 3'. The signal from the A/D converter 4 is latched by latch circuit S for a time duration of each pulse of a pulse signal derived from a switching circuit to be described hereinafter in more detail. The device shown in FIG. 2 also includes: (1) a decoder 6 which decodes the latched BCD signal to a seven segment signal, (2) a driver 7 which simplifies the seven segment signal, and (3) a digital display 8 which displays the amplified signal in a seven segment fluorescent display tube provided therein. The structure described above is substantially the same as the FIG. 1 device.

The device according to the present invention further includes an acceleration sensor circuit 9 which in turn includes: (1) a sample and hold circuit 10 which holds the voltage signal $S_v$ from the F/V converter 2, using the clock pulse signal $CK_0$ from the clock pulse generator 3' as a timing signal, (2) a differential amplifier 11 which receives the voltage signal $S_v$ at a noninverting input terminal thereof and the output $S_H$ of the hold circuit 10 at an inverting input terminal thereof and outputs a signal $\pm\Delta S$ representing the difference therebetween, and (3) an absolute value circuit 12 which outputs the absolute value of the signal $\pm\Delta S$ ($+\Delta S$ when $S_v > S_H$; $-\Delta S$ when $S_v < S_H$).

Figure 3:
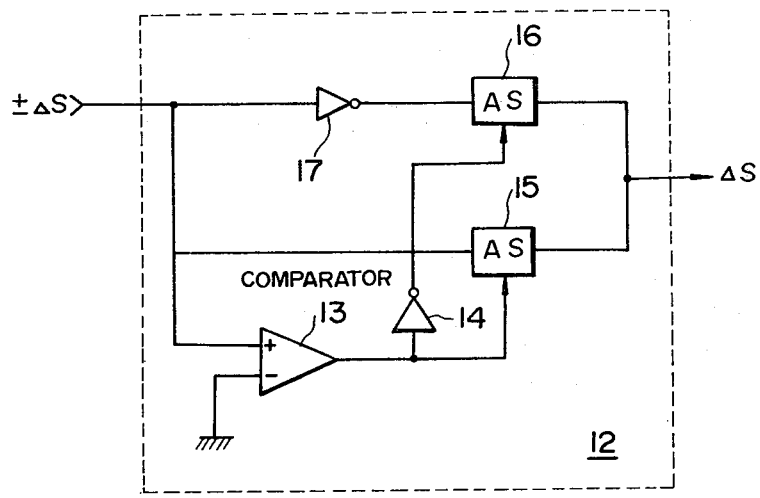
FIG. 3 is a block diagram of an absolute value circuit for use in the circuit of FIG. 2.

As seen in the example shown in FIG. 3, this absolute value circuit 12 includes: (1) a comparator 13 which receives the voltage signal $\pm\Delta S$ from the differential amplifier 11 and compares it with a reference value (for example zero), (2) an inverter 14 which inverts the output of the comparator 13, (3) a pair of analog switches 15 and 16 wherein the switch 15 conducts an analog signal when the output of the comparator 13 is high and is open circuit when the output of the comparator 13 is low, and the switch 16 conducts an analog signal when the output of the inverter 14 is high and is open circuit when the output of the inverter 14 is low. The analog switches 15 and 16 respectively respond to the $\pm\Delta S$ signal directly and through an inverter 17 responsive to the $\pm\Delta S$ signal. Switches 15 and 16 also respectively respond to the output from the comparator 13 and the inverter 14. Thus, when the output of the differential amplifier 11 is $\pm\Delta S$ and therefore the output of the comparator 13 is high, the analog switch 15 is closed and the analog switch 16 is opened so that the voltage signal $\pm\Delta S$ as it stands is outputted through the analog switch 15. On the contrary, when the voltage signal from the amplifier 11 is $-\Delta S$, the output level of the comparator 13 is low so that the analog switch 16 is now closed and the analog switch 15 is opened so that the voltage signal $-\Delta S$ is inverted by the inverter 17 into signal $+\Delta S$ which is now outputted through the analog switch 16.

Referring again to FIG. 2, the device according to the present invention further includes a display control circuit 18 which controls the time interval for updating the contents of the digital display 8 according to the magnitude of the output signal $\Delta S$, representing the absolute value of acceleration as derived from the acceleration sensor circuit 9. The display control circuit 18 includes a pair of comparators 19 and 20 which receive the voltage signal $\Delta S$ at noninverting input terminals thereof. Inverting input terminals of comparators 19 and 20 respectively respond to reference voltage levels $V_{r1}$ and $V_{r2}$, where $V_{r2}$ is higher than $V_{r1}$, levels $V_{r1}$ and $V_{r2}$ are formed by dividing the power supply level $+V$ with resistors $R_1$, $R_2$ and $R_3$ connected in series. The display control circuit 18 further includes a switching or selecting circuit 21 which receives outputs signals a and b of the comparators 19 and 20, as well as clock signals $CK_2$, $CK_3$ and $CK_4$ of frequencies $f_2$, $f_3$ and $f_4$, respectively, as derived from clock generator 3. Circuit 21 responds to the inputs thereof to selectively derive: (1) clock signal $CK_2$ when both the output signals a and b of the comparators 19 and 20 are low, (2) a clock signal $CK_3$ the output signal a is high and signal b is low, (3) and clock signal $CL_4$ when the signals a and b are both high. The output of the switching circuit 21 is fed to the latch circuit 5 as a latching signal. The clock signal frequencies are such that $f_2 < f_3 < f_4$.

Figure 4:
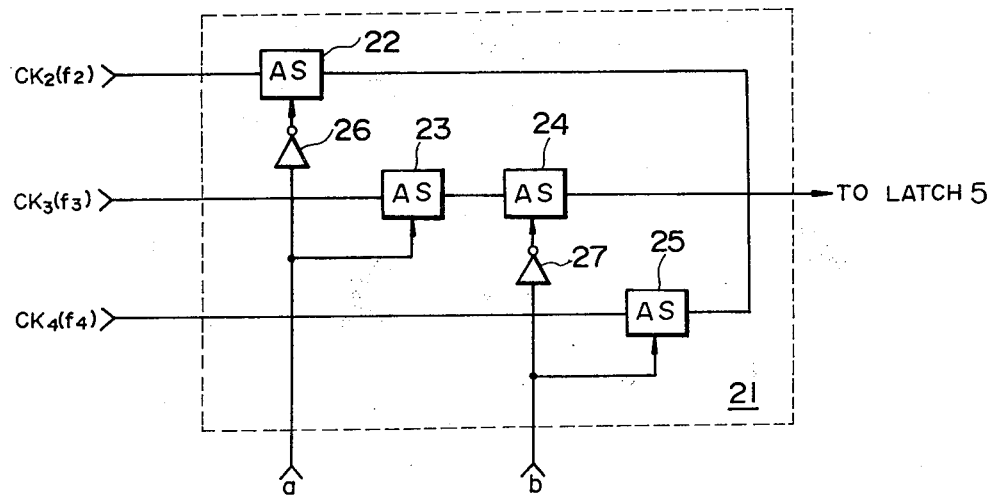
FIG. 4 is a block diagram of a switching circuit for use in the circuit of FIG. 2.

In FIG. 4, is illustrated a particular embodiment of switching circuit 21. Analog switches 22, 23, 24 and 25 receive the clock signals $CK_2$, $CK_3$, the output of the switch 23, and the clock signal $CK_4$, respectively. A control input of analog switch 22 responds to an inverted replica of signal a, as derived from inverter 26, the control input of analog switch 23 receives the signal a directly, the control input of the analog switch 24 responds to an inverted replica of signal b, as derived from inverter 27, and the control input of analog switch 25 receives the signal b directly. Thus, when the signals a and b are both low, the analog switch 22 only is closed since the signal a is inverted by the inverter 26 whereby the clock pulse signal $CK_2$ is outputted; when the signals a and b are high and low, respectively, only the analog switches 23 and 24 are closed in response to signal a and the complement of the signal b, respectively, whereby the clock signal $CK_3$ is outputted; and when the signals a and b are both high, only the analog switch 25 is closed whereby the clock pulse signal $CK_4$ is outputted.

In the overall operation of the speed display device, the operation of the acceleration sensor circuit 9 is initially described. While the vehicle is being driven at a substantially constant speed, the voltage signal $S_v$ from the F/V converter 2 is substantially constant. Thereby the amplitudes of voltages $S_H$ and $S_v$, respectively by network 10 sampled and held at time point T and $T+\Delta T$ in response to adjacent pulses of the clock signal $CK_0$ from the clock pulse generator 3' are substantially equal. Thus the output of the differential amplifier 11 is zero or very small, and therefore is very small compared with the reference voltage input values to the comparators 19 and 20.

When the vehicle or engine speed changes substantially, however, the output $S_v$ from the F/V converter 2 increases or decreases accordingly. Thus the hold voltage $S_H$ sampled and held at the time $T_1$ and the voltage signal $S_v$ at the time $T_1 + \Delta T$ are in the relationship of $S_v > S_H$ during acceleration and in the relationship of $S_v < S_H$ during deceleration. The differential amplifier 11 outputs the voltage signal $\pm\Delta S$ which is proportional to the difference between the $S_v$ and $S_H$, i.e. the magnitude of the acceleration or deceleration. The absolute value circuit 12 then outputs a positive voltage signal $\Delta S$.

When the voltage signal $\Delta S$ from the acceleration sensor circuit 9 is smaller than the reference voltages $V_{r1}$ and $V_{r2}$, i.e. when the speed change is zero or small, the output signals a and b are held low. Thus the switching circuit 21 outputs the clock signal $CK_2$ from the clock pulse generator 3' as a latch signal to the latch circuit 5. If the frequency $f_2$ of the clock signal $CK_2$ is relatively low so as to provide a relatively long latch time in the latch circuit 5, the time interval for updating the contents of the display 8 is relatively long so that a small change in speed is not displayed and the display does not flicker.

When the voltage signal $\Delta S$ increases as the amount of speed change increases with the result that $V_{r2} \geq \Delta S \geq V_{r1}$, the output a of the comparator 19 becomes high so that the switching circuit 21 outputs the clock signal $CK_3$ as a latch signal to the latch circuit 5. Since the frequency $f_3$ of the clock signal $CK_3$ is higher than the frequency $f_2$ of the clock signal $CK_2$, the latching time interval of the latch circuit 5, and therefore the time interval for updating the contents of the display 8 are shorter. Thus the display contents are close to the actual speed of the vehicle.

When the speed changes even more rapidly where the signal voltage $\Delta S$ further increases so as to satisfy $\Delta S \geq V_{r2}$, and the output b of the comparator 20 becomes high, the switching circuit 21 outputs the clock signal $CK_4$ as a latch signal to the latch circuit 5. Since the frequency $f_4$ of the clock signal $CK_4$ is even higher than the frequency $f_3$ of the clock signal $CK_3$, the latch time interval of the latch circuit 5 becomes even shorter. Consequently, the time interval for updating the contents of the display 8 is reduced further with the result that the vehicle speed is displayed with good follow-up and with good visibility even during rapid acceleration or deceleration. For example, the time intervals for updating the contents of the digital display 8 may be 1, 0.5 and 0.1 seconds.

In a speedometer device, instead of the acceleration sensor, circuit 9, a mechanical acceleration sensor e.g. a pendulum, may be provided at any place in the vehicle body such that the frequency of the latch signal is switched according to the magnitude of the output of the sensor.

In the above embodiment, two counters may be used instead of the F/V converter 2 and the A/D converter 4, respectively, in order to display the vehicle speed by using the number of pulses inputted to the two counters for a predetermined time interval. In this case, the sample and hold circuit 10 should be replaced by a digital latch circuit for example, the differential amplifier 11 should be a digital subtracter, and the absolute value circuit 12 should be of digital type. In the display control circuit 18, the comparators 19 and 20 should be of digital type and the switching circuit 21 should be a multiplexer. In this case, the control or timing signals for controlling the respective elements should be properly determined thereby resulting in processing all signals digitally. To this end, a well known microcomputer may be used.

In the above embodiment, the application of the present invention to the speedometer has been described, but the present invention may be applicable to a tachometer in the same manner.

While the present invention has been described and shown with respect to a preferred embodiment thereof, the present invention is not limited to this. Many modifications and variations could be made by those skilled in the art without departing from the spirit of the present invention.

What is claimed is:

1. A speed display device comprising:
    means for sensing the magnitude of the rate of change of a speed to be displayed, and
    means for controlling the time interval for updating the speed displayed according to the sensed magnitude.

2. The device according to claim 1, wherein said controlling means controls the time interval for updating the speed displayed in such a manner that the time interval is shorter when a larger change in the speed is sensed than the time interval when a smaller change in the speed is sensed.

3. The device according to claim 1 or 2, wherein said sensing means includes means for holding the instantaneous speed value for a predetermined time, and means for producing a difference signal representing the difference between the current speed and the instantaneous speed value held by said holding means.

4. The device according to claim 3, wherein said controlling means includes: means for latching an instantaneous value of the speed, a first comparator for comparing the output of said sensing means with a first predetermined reference value, a second comparator for comparing the output of said sensing means with a second predetermined reference value higher than the first predetermined reference value, means for generating three clock signals with different frequencies, and means for selecting one of the three clock signals according to the outputs of said first and second comparators to supply the selected clock signal to said latching means to control the latching time duration by pulses of the selected clock signal.

5. The device according to claim 4, wherein the speed is represented by a pulse signal having a frequency proportional to the speed to be displayed, wherein said device includes means for counting pulses of the pulse signal for a predetermined time interval, and wherein said latching means is a latch for latching the number of pulses counted, and wherein said difference producing means is a subtracter.

6. The device according to claim 3, further including an absolute value circuit including a third comparator for comparing the output of said producing means with a particular value, a first analog switch for selectively passing the difference signal to said controlling means when the difference signal has a predetermined one of positive and negative signs, an inverter for inverting the sign of the output of said third comparator, a second inverter for inverting the sign of the difference signal, a second analog switch responsive to the inversion of the sign of the output of said third comparator for selectively passing the output of the said inverter to said controlling means.

7. The device according to claim 6, wherein said selecting means includes a third analog switch closed when the output of said first comparator is low and selectively passing the first clock signal to said latching means, fourth and fifth analog switches connected in series, said fourth analog switch being closed when the output of said first comparator is high and selectively passing the second clock signal to said fifth analog switch, said fifth analog switch being closed when the output of said second comparator is low and selectively passing the third clock signal to said latching means.

8. Apparatus for indicating the frequency of a source subject to frequency changes comprising a digital display having a tendency to flicker, means responsive to the source for supplying the display with a digital signal indicative of the frequency of the source, said display supplying means including a latch circuit for storing a digital signal indicative of the frequency of the source, means for controlling the latching duration of the latch circuit as a function of the magnitude of the rate of change the frequency of the source so that the latching duration is relatively long when the frequency of the source is relatively constant and the latching duration decreases from the relatively long duration to shorter durations as the frequency of the source changes so that the flicker of the display is substantially obviated, small frequency changes at relatively constant frequency are not displayed and rapid frequency changes are relatively accurately displayed.

9. Apparatus for indicating the frequency of a source subject to frequency changes comprising a digital display, means responsive to the source for supplying the display with a digital signal indicative of the frequency of the source, said display supplying means including a latch circuit for storing a digital signal indicative of the frequency of the source, means for controlling the latching duration of the latch circuit as a function of the magnitude of the rate of change the frequency of the source so that the latching duration is relatively long when the frequency of the source is relatively constant and the latching duration decreases from the relatively long duration to shorter durations as the frequency of the source changes so that small frequency changes at relatively constant frequency are not displayed and rapid frequency changes are relatively accurately displayed.

10. The apparatus of claim 8 or 9 wherein the latching duration control means includes means for sensing magnitude ranges in the rate of change of the frequency, and means responsive to the sensed range for step wise changing the latching duration.

11. Apparatus for indicating the frequency of a source subject to frequency changes comprising a display, the display being of a type requiring a memory for supplying the display with signals, means responsive to the source for supplying the display with a signal indicative of the frequency of the source, said display supplying means including a means for storing a signal indicative of the frequency of the source, means for controlling the frequency at which the storing means is responsive to the source and the frequency at which the signal stored in the storing means is supplied to the display as a function of the magnitude of the rate of change of the frequency of the source so that the storing means supplies the signal stored therein relatively infrequently to the display when the frequency of the source is relatively constant and the storing means supplies the signal stored therein relatively frequently to the display as the frequency of the source changes so that small frequency changes at relatively constant frequency are not displayed and rapid frequency changes are relatively accurately displayed.

* * * * *